(12) United States Patent
Sharma et al.

(10) Patent No.: US 11,941,263 B2
(45) Date of Patent: Mar. 26, 2024

(54) FLASH-TRANSLATION-LAYER-AIDED POWER ALLOCATION IN A DATA STORAGE DEVICE

(71) Applicant: Western Digital Technologies, Inc., San Jose, CA (US)

(72) Inventors: Amit Sharma, Bengaluru (IN); Niranjana Bhatta, Bengaluru (IN); Abhinandan Venugopal, Bengaluru (IN)

(73) Assignee: Western Digital Technologies, Inc., San Jose, CA (US)

(*) Notice: Subject to any disclaimer, the term of this patent is extended or adjusted under 35 U.S.C. 154(b) by 39 days.

(21) Appl. No.: 17/734,398

(22) Filed: May 2, 2022

(65) Prior Publication Data

US 2023/0350586 A1    Nov. 2, 2023

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
CPC ..... G06F 3/0625; G06F 3/0659; G06F 3/0679
See application file for complete search history.

(56) References Cited

U.S. PATENT DOCUMENTS

| | | |
|---|---|---|
| 9,123,400 B1 | 9/2015 | Yang et al. |
| 10,095,432 B2 | 10/2018 | Sebastian et al. |
| 10,684,794 B2 | 6/2020 | Tidwell et al. |
| 11,029,859 B2 | 6/2021 | Margetts et al. |
| 11,036,426 B2 | 6/2021 | Jung |
| 2017/0084344 A1* | 3/2017 | Choi ....................... G06F 1/329 |
| 2021/0294407 A1 | 9/2021 | Yu et al. |

* cited by examiner

*Primary Examiner* — Jae U Yu
(74) *Attorney, Agent, or Firm* — Michael Best & Friedrich LLP

(57) ABSTRACT

A data storage device having an FTL configured to award to some pending memory operations a higher priority compared to the priority given to those operations by a default scheduling scheme. Such awards of higher priority may be based on a policy directed, e.g., at maximizing the effective data throughput, balancing the data throughput and the input/output bus throughput, or other performance objective. In response to awards of higher priority, a power-management circuit of the data storage device may dynamically route a constrained power supply such that the storage dies corresponding to the higher-priority operations preferentially receive power allocation in the next time interval(s). The remainder of the power budget (if any) in those time intervals may be allocated in accordance with the default scheduling scheme. According to an embodiment, nonlimiting examples of higher-priority operations may include read-retry operations, read-scrub-based relocation, internal control operations, or other suitable higher-priority operations.

20 Claims, 8 Drawing Sheets

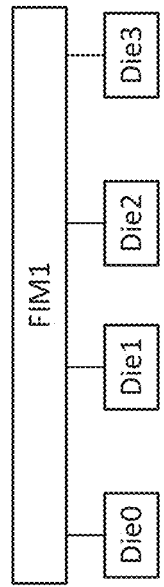
FIG. 6A
time t1
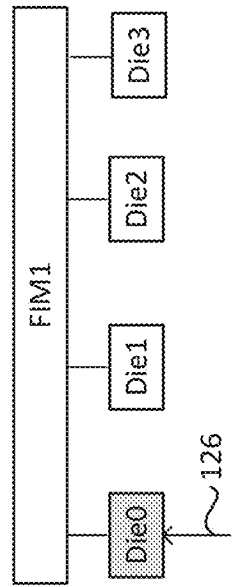
FIG. 6B
time t2 > t1
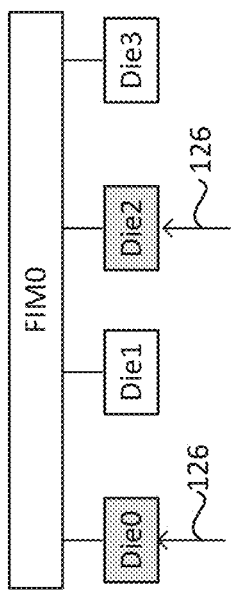
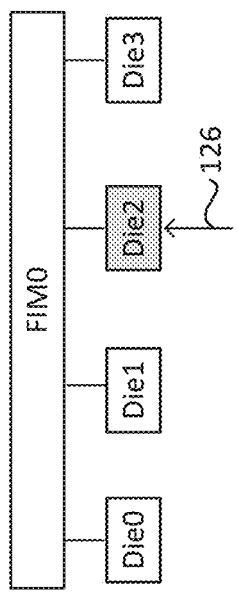

FLASH-TRANSLATION-LAYER-AIDED POWER ALLOCATION IN A DATA STORAGE DEVICE

FIELD

This application relates generally to data storage devices, and more specifically but not exclusively, to power-management solutions for such devices.

BACKGROUND

This section introduces aspects that may help facilitate a better understanding of the disclosure. Accordingly, the statements of this section are to be read in this light and are not to be understood as admissions about what is in the prior art or what is not in the prior art.

A data storage device, e.g., a solid-state drive (SSD), may typically have an electronic controller connected to a plurality of (e.g., NAND-flash) memory devices organized into multiple channels with banks of storage dies, which process memory commands and/or operations. The controller may run a scheduler to determine the order in which various (e.g., read, write, and erase) commands are issued across multiple channels to multiple banks running in parallel at a given time. The parallelism typically helps such data storage devices to achieve a higher level of performance than that of comparable serial or single-channel devices.

It is not unusual for a data storage device to receive a power supply from an external source, e.g., through a universal-serial-bus (USB) connector or another suitable interface. The externally supplied power may be distributed to different components having different current and voltage needs. The current available from the power source may be limited. If the current demand in the data storage device exceeds a certain threshold, then the voltage may drop. Disadvantageously, some memory devices may be unable to function properly when the power supply goes out of range. It is generally desirable to manage the power in a manner that maintains the power consumption in the data storage device within the available power budget to avoid such instances.

SUMMARY

Disclosed herein are various embodiments of a data storage device having a flash translation layer (FTL) configured to award, to some pending memory operations, a higher priority compared to the priority given to those operations by a default scheduling scheme. Such awards of higher priority may be based on a policy directed, e.g., at maximizing the effective data throughput, balancing the data throughput and the input/output bus throughput, or other performance objective. In response to awards of higher priority, a power-management circuit of the data storage device may dynamically route a constrained power supply such that the storage dies corresponding to the higher-priority operations preferentially receive power allocation in the next time interval(s). The remainder of the power budget (if any) in those time intervals may be allocated in accordance with the default scheduling scheme. According to an embodiment, nonlimiting examples of higher-priority operations may include read-retry operations, read-scrub-based relocation, internal control operations, or other higher-priority operations.

According to an example embodiment, provided is a data storage device, comprising: a first plurality of storage dies to store data; a power-management circuit to connect a power supply to a second plurality of the storage dies, the second plurality being a subset of the first plurality and being dynamically changeable in time; and a controller including firmware for a flash translation layer; wherein the flash translation layer is configured to maintain a queue of pending operations for the first plurality of dies and is further configured to award, in a time interval, a higher priority to a first subset of the pending operations than to a different second subset of the pending operations, at least one operation of the first subset being in the queue behind at least one operation of the second subset; and wherein, in response to the first subset being selected by the flash translation layer, the power-management circuit is configured, in the time interval, to include storage dies corresponding to the first subset into the second plurality of the storage dies.

According to another example embodiment, provided is a method performed by a data storage device, the method comprising: maintaining a queue of pending operations for a first plurality of storage dies of the data storage device; awarding, in a time interval, a higher priority to a first subset of the pending operations than to a different second subset of the pending operations, at least one operation of the first subset being in the queue behind at least one operation of the second subset; and connecting a power supply to a second plurality of the storage dies, the second plurality being a subset of the first plurality and being dynamically changeable in time; and wherein, in the time interval, the connecting comprises including storage dies corresponding to the first subset into the second plurality of the storage dies in response to the awarding.

According to yet another example embodiment, provided is an apparatus, comprising: means for maintaining a queue of pending operations for a first plurality of dies of the data storage device; means for awarding, in a time interval, a higher priority to a first subset of the pending operations than to a different second subset of the pending operations, at least one operation of the first subset being in the queue behind at least one operation of the second subset; and means for connecting a power supply to a second plurality of the storage dies, the second plurality being a subset of the first plurality and being dynamically changeable in time; and wherein, in the time interval, the means for connecting is configured to include storage dies corresponding to the first subset into the second plurality of the storage dies in response to the awarding.

Various aspects of the present disclosure provide for improvements in data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIGS. 6A-6B are diagrams schematically illustrating another example application of the method of FIG. 4 according to an embodiment.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of ordinary skill in the pertinent art that, although the present disclosure refers to NAND flash, the concepts discussed herein may be applicable to other types of solid-state memory, such as NOR, PCM (Phase Change Memory), etc.

Figure 1:
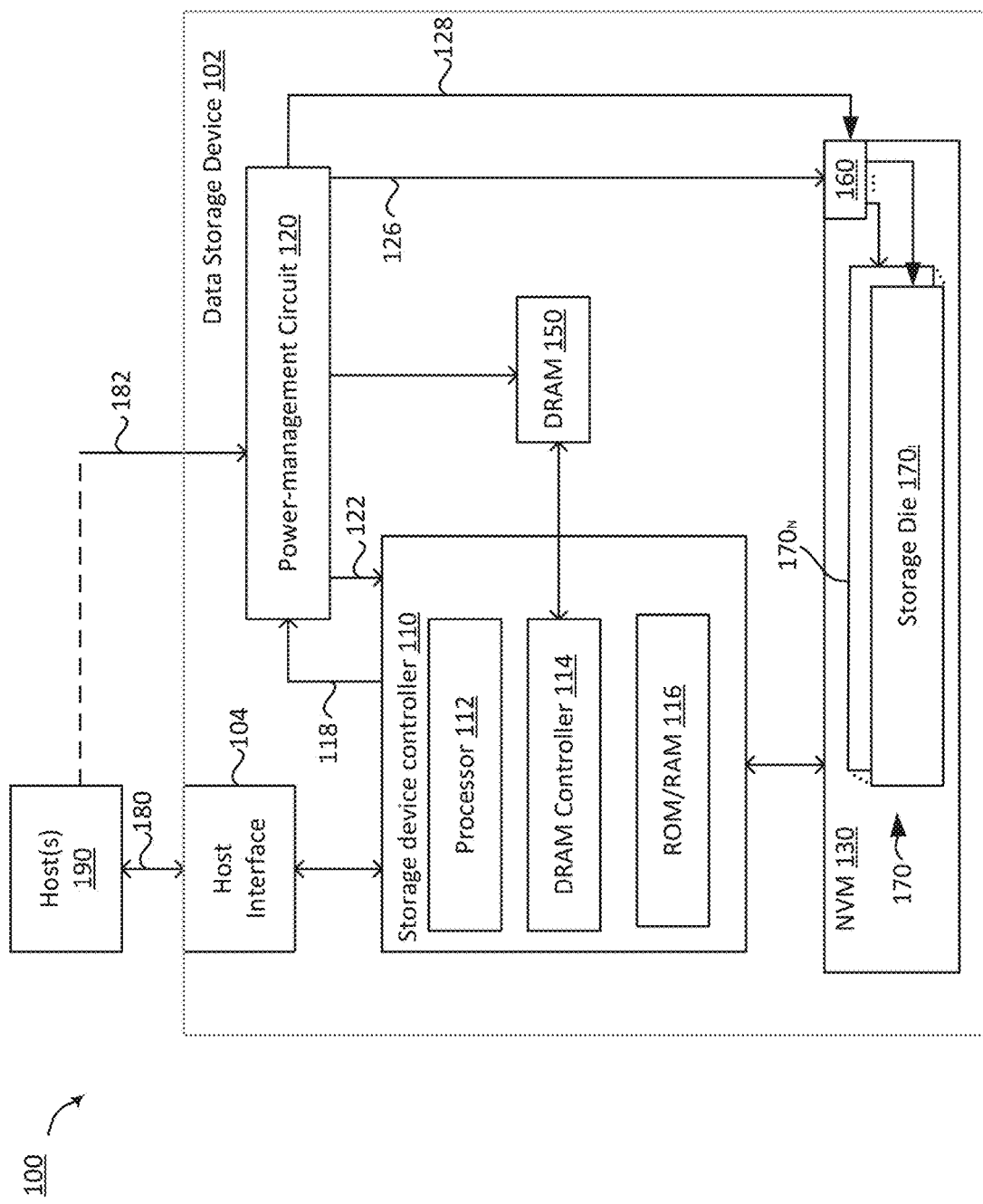
FIG. 1 is a block diagram illustrating a data-processing system in which example embodiments may be practiced.

FIG. 1 is a block diagram illustrating a data-processing system 100 in which example embodiments may be practiced. System 100 comprises a data storage device 102 connected to a host device 190 by way of a communication path 180. In an example embodiment, communication path 180 can be implemented using an electrical bus, a wireless connection, or any other suitable data link. Data storage device 102 can be a flash memory device, e.g., an SSD.

In some embodiments, data storage device 102 may be embedded within host device 190. In some other embodiments, data storage device 102 may be removable from host device 190, e.g., may be removably coupled to the host device in accordance with a removable USB configuration. In some embodiments, data storage device 102 may be used as an embedded storage drive, e.g., a mobile embedded storage drive, an enterprise storage drive (ESD), a client storage device, a cloud storage drive, or other suitable storage drive.

As shown in FIG. 1, data storage device 102 comprises a host interface 104, an electronic controller 110, a power-management circuit (PMC) 120, a non-volatile memory (NVM) 130, and a volatile memory (e.g., dynamic random-access memory, DRAM) 150. In operation, host interface 104 enables communications between data storage device 102 and host device(s) 190. Such communications may include, inter alia, transmission of data between NVM 130 and host device(s) 190. NVM 130 comprises a plurality 170 of storage dies 1701-170N, which may include any one type or any suitable combination of NAND flash devices, NOR flash devices, and other suitable non-volatile memory devices. Storage dies 1701-170N may be organized into channels, each of the channels being based on a corresponding bus, e.g., an 8-bit bus, connecting the corresponding subset of storage dies 1701-170N to controller 110. Individual ones of storage dies 1701-170N may further be organized into a hierarchy of planes, blocks, and pages. NVM 130 and/or individual storage dies 170n (n=, 1, 2, . . . , N) thereof may also include support circuitry (not explicitly shown in FIG. 1), such as read/write circuitry. Such read/write circuitry may be implemented in a single component or may be divided into separate components, such as a read-circuitry component and a separate write-circuitry component. In an example embodiment, DRAM 150 is used, inter alia, to store a logical-to-physical (L2P) table of the FTL.

Figure 3:
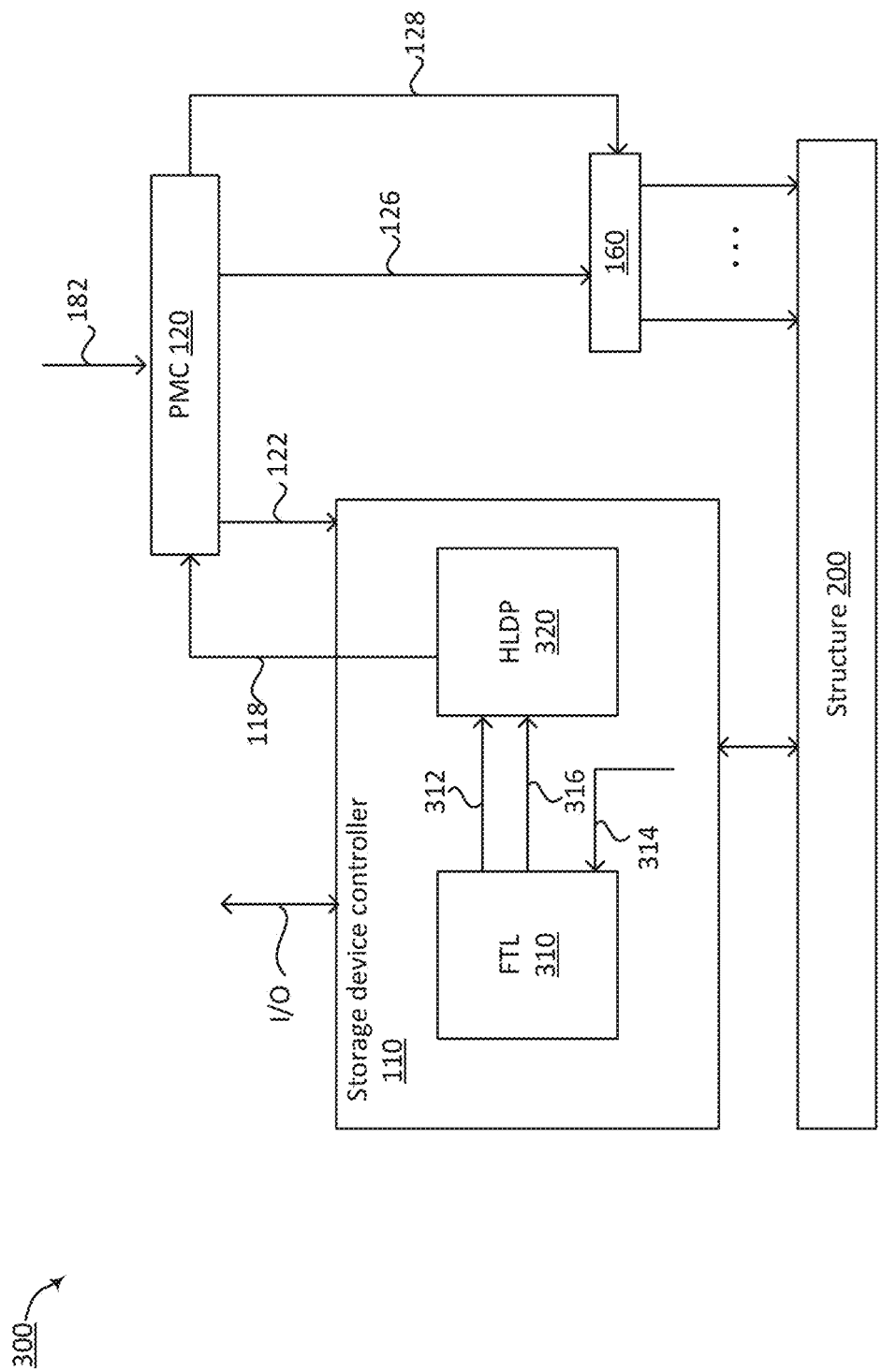
FIG. 3 is a block diagram illustrating certain functions of a portion of the data-processing system of FIG. 1 according to an embodiment.

Controller 110 incorporates circuits, firmware, and software that bridge NVM 130 to host interface 104, with only some of such components being indicated in FIG. 1 for clarity (also see FIG. 3). For example, controller 110 may include: (i) an embedded processor 112; (ii) a DRAM controller 114; (ii) an electrically erasable firmware read-only memory (ROM) and a system random access memory (RAM), 116; (iv) an error-correction circuit (not explicitly shown in FIG. 1); and (v) a flash component interface (not explicitly shown in FIG. 1). Processor 112 is configured to support, e.g., some or all of the following operations: wear leveling, bad-block management, data scrambling, garbage collection, address mapping, or other suitable operations. DRAM controller 114 operates as an electronic controller of DRAM 150.

An external power supply 182 received by data storage device 102 is directed to PMC 120. PMC 120 then distributes the received power to various components of data storage device 102, such as controller 110, NVM 130, and DRAM 150. For example, as indicated in FIG. 1, PMC 120 receives external power supply 182, and power supplies 122 and 126 are from PMC 120 to controller 110 and NVM 130, respectively. In operation, a power-distribution switch 160 or other suitable circuit of NVM 130 may connect a selected subset of storage dies 1701-170N to power supply 126 provided by PMC 120. A control signal 118 generated by controller 110 may be used to cause PMC 120 to generate a corresponding control signal 128 for power-distribution switch 160 to selectively connect power supply 126 to different ones of storage dies 170g. Such connections may be dynamically changed, e.g., as described in more detail below. Typically, the number k of selected dies among storage dies 1701-170N that power-distribution switch 160 connects to power supply 126 at the same time is limited by the following inequality: 1cK<N, where K is a fixed integer greater than one. In an example embodiment, the number K may be in the range, e.g., from two to eight. In some embodiments, external power supply 182 may be received from host 190, as indicated by the corresponding dashed line in FIG. 1.

In other possible embodiments, the firmware of controller 110 may be used to track which of the storage dies 1701-170N are busy (are consuming power) and then schedule further operations to the storage dies such that the total power (e.g., the total number of active dies) does not exceed the power budget. For example, with the total power budget of four units of power, four operations may be scheduled, assuming for the sake of this example that one operation takes one unit of power. Then, in an eight-die NVM 130, an example embodiment will cause one or more prioritized dies 170n to continue receiving their units of power as needed. The remaining units of power (if any) may be dynamically allocated to operations on non-prioritized dies, thereby keeping the total power consumption within the power budget at different times.

Figure 2:
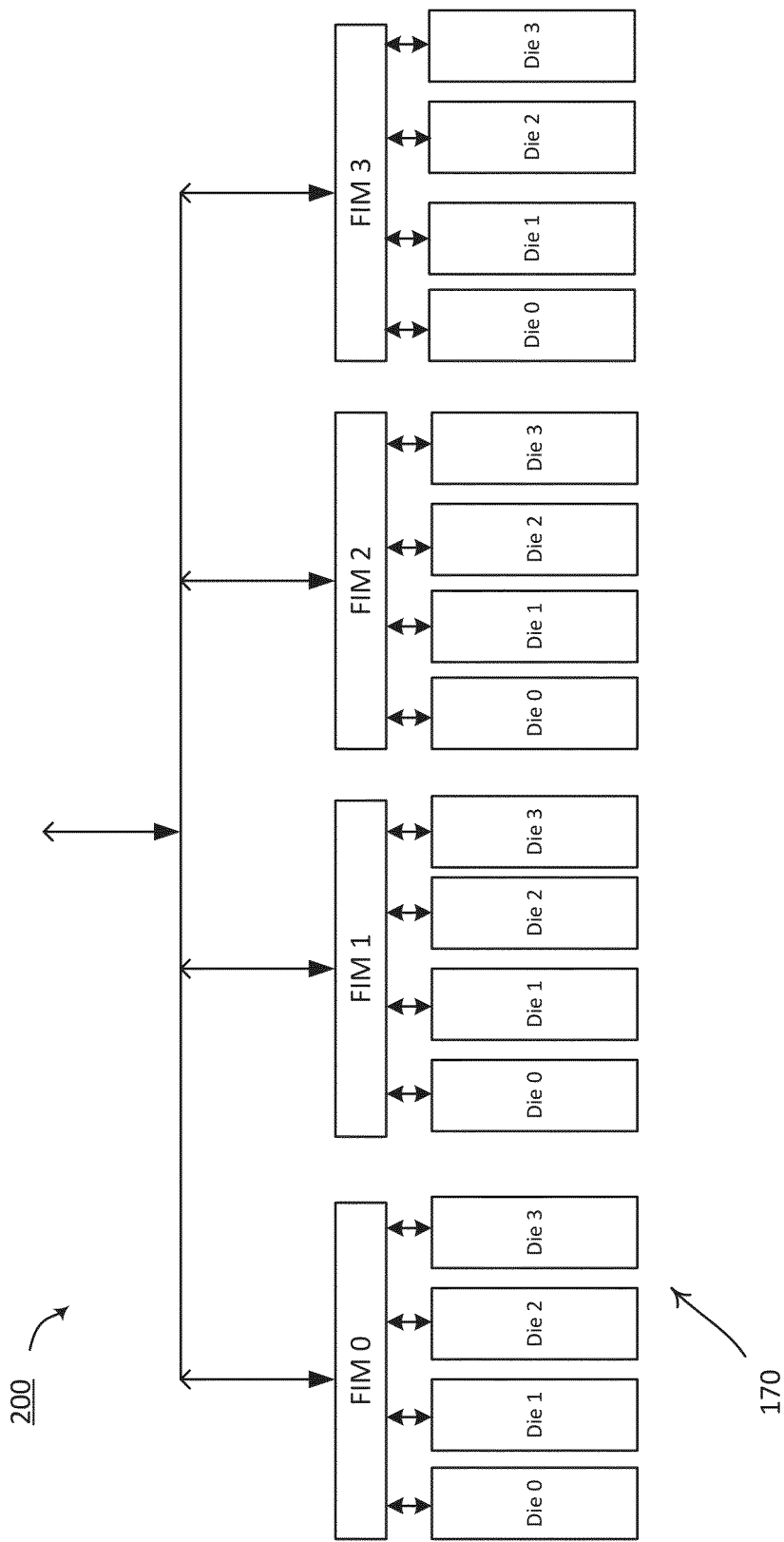
FIG. 2 is a block diagram illustrating an example structure that may be used to organize storage dies in the data-processing system of FIG. 1 according to an embodiment.

FIG. 2 is a block diagram illustrating an example structure 200 that may be used to organize the plurality 170 of storage dies 170 1-170N in data storage device 102 according to an embodiment. Structure 200 corresponds to N=16 and has four flash-interface modules (FIMs), which are labeled FIM0-FIM3. Each of the FIMs is used to connect four respective storage dies 170n, labeled Die0-Die3, and supports direct memory access (DMA) to those dies. In an alternative embodiment, structure 200 may have a different (from four) number of FIMs and/or a different (from four) number of dies per FIM.

Conventional power management schemes may have significant difficulties in adequately addressing one or more of the following challenges posed by the continuing development of various memory products.

There exists a strong incentive for the use of non-prime NAND dies in some SSD products. However, non-prime dies are prone to generating more errors than prime dies and, as such, can trigger the internal error-handling mechanisms more often. One example of such an error-handling mechanism is a read-retry mechanism, such as the bit error statistic (BES), Soft Bit reads, De-XOR, or other read-retry mechanisms. Another example is a read-scrub-based relocation, wherein an unacceptably high bit-error rate (BER) detected by an internal scan may typically trigger data transfer to a new block. Despite a higher relative error-handling overhead, the products employing non-prime dies are nevertheless intended to meet data-speed requirements, even at the end of life (EOL) of the product.

4-Bit-Per-Cell (X4) memories are being adapted in many storage products. However, the X4 configuration is typically characterized by narrower voltage distributions, which may cause more errors than, e.g., X3 or X2 memories. In addition, X4 memories may start exhibiting indications of certain types of failure at a lower number of program-erase cycles.

Computational storage is another relatively new development, according to which a data storage device is enabled to perform some computations in situ and then send the results back to the host. Furthermore, in-memory computational power is becoming an inherent feature in some market sectors, e.g., in products employing the crossbar-array (CBA) technology. In-memory computations may engage the corresponding dies for a longer time, which may manifest itself as in a higher storage-die utilization and lower host input/output (I/O) bus utilization. Yet, it is typically more advantageous to optimally utilize both the storage dies and the host I/O bandwidth.

The above-indicated and possibly some other related problems in the state of the art may beneficially be addressed using at least some embodiments disclosed herein. More specifically, according to an example embodiment, controller 110 may operate to dynamically generate control signal 118 based on the present operational state of data storage device 102 as a whole, e.g., as assessed using the pertinent attributes of the FTL thereof. For example, control signal 118 may be generated by controller 110 while considering the totality of queued operations and then selecting, for power-allocation purposes, a subset of such pending operations that is most impactful for achieving an optimum (e.g., maximum) payload-data throughput for data storage device 102. In response to control signal 118 generated in this manner, PMC 120 may allocate power to a subset of storage dies 170n corresponding to the selected subset of operations.

As the contents of the operations queue change over a sequence of time intervals, control signal 118 may be dynamically adjusted to maintain a nearly optimal performance in accordance with the selected performance objective.

FIG. 3 is a block diagram illustrating certain functions of a portion 300 of data storage device 102 according to an embodiment. Hardware components of portion 300 have already been described above in reference to FIGS. 1-2, and their description is not repeated here. An FTL 310 and a High Level Data Path (HLDP) module 320 shown in FIG. 3 are firmware layers of controller 110 implemented using the pertinent hardware components thereof.

In operation, FTL 310 may populate a command/operation queue, a copy 312 of which is provided to HLDP module 320, as indicated in FIG. 3. HLDP module 320 may generate control signal 118 in accordance with the power budget and/or schedule die operations based on applicable power-allocation policies. In response to control signal 118, PMC 120 may then generate control signal 128 to correspondingly configure power-distribution switch 160 to connect power supply 126 to the selected subset of storage dies 170 1-170N of structure 200. The corresponding queued commands/operations may then be executed in the subset of storage dies 170 1-170N receiving the allocated power in accordance with control signals 118, 128. When a particular storage die 170n does not have power supply 126 connected thereto in a time interval, the queued operations (if any) on that die are not scheduled for execution in that time interval and remain in queue 312. Upon completion of the corresponding operation(s) in the power-receiving dies, said operation(s) is (are) dequeued, e.g., based on updates 314 received by FTL 310.

Under conventional HLDP scheduling, the commands/operations of queue 312 may be scheduled for execution in accordance with the power budget and further in accordance with an operative (hereafter "default") scheduling scheme, which can be, e.g., an age-based, round-robin, first-in/first out (FIFO), or other suitable scheme. In contrast, in an example embodiment, FTL 310 may award higher priority to some of the pending commands/operations compared to that given to them by the default scheduling scheme. Such awards of higher priority may be based on a scheduling policy directed, e.g., at optimizing (e.g., maximizing) the effective payload-data throughput in view of the present state of queue 312 or achieving some other performance objective. A list 316 of the pending commands/operations from queue 312 that are awarded such higher priority may be communicated to HLDP module 320. In response to list 316, HLDP module 320 may generate control signal 118 such that: (i) the dies implicated by list 316 will preferentially receive power allocation in the next time interval(s); and (ii) the remainder of the power budget (if any) in those time intervals will be allocated in accordance with the default scheduling scheme. Several non-limiting examples of commands/operations that may be selected by FTL 310 for list 316 are described in more detail below in reference to FIGS. 5-8. Note that, for time intervals in which list 316 is empty, the default scheduling scheme remains in effect.

Figure 4:
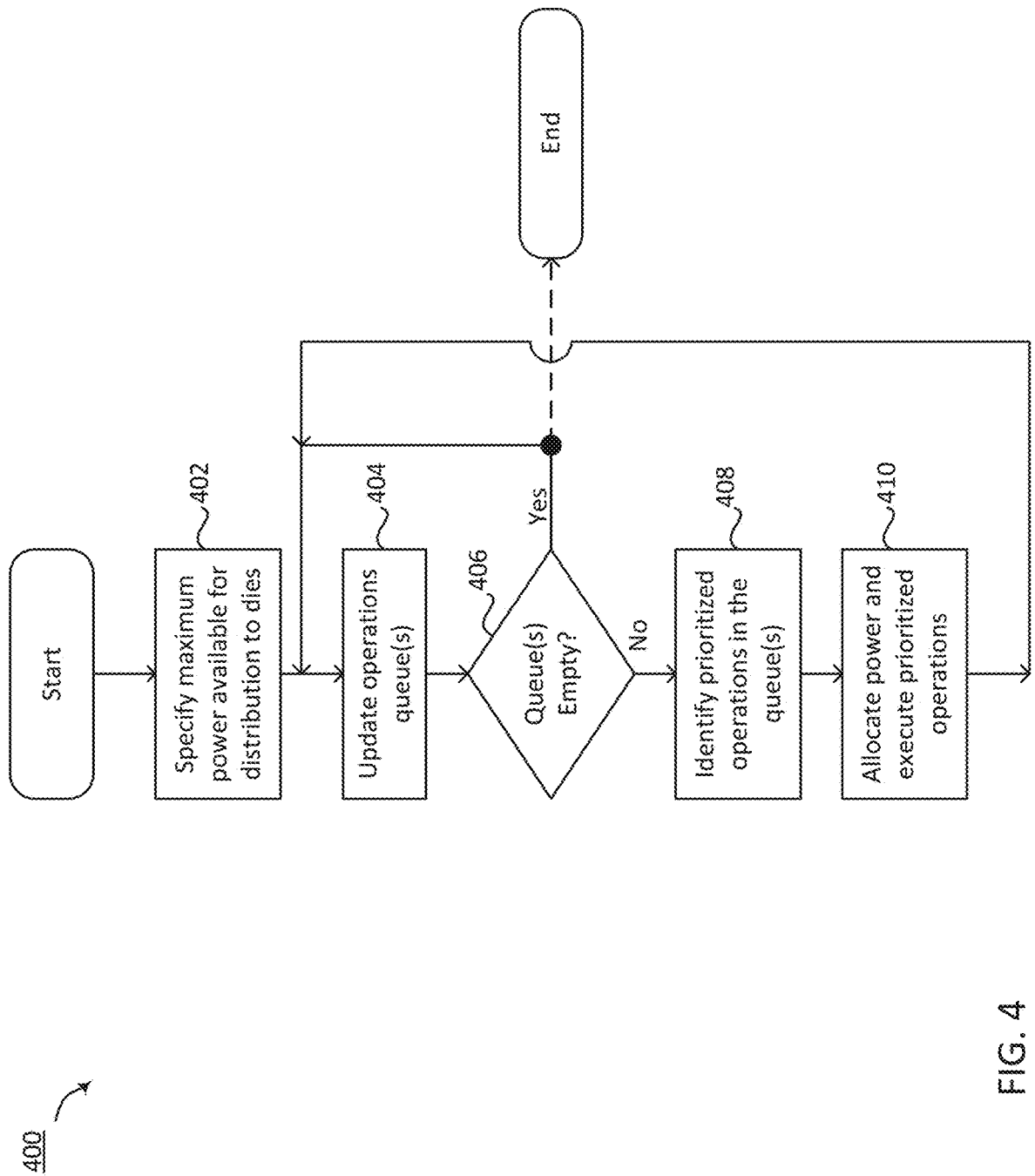
FIG. 4 is a flowchart illustrating a power-allocation method according to an embodiment.

FIG. 4 is a flowchart illustrating a power-allocation method 400 that can be implemented in portion 300 according to an embodiment. FIG. 4 is described below with continued reference to FIG. 3. Some embodiments of method 400 are also applicable to architectures of controller 110, wherein multiple queues per storage die 170n may be implemented. Illustrative examples of such multiple queues may include but are not limited to a queue for host operations, a queue for internal operations, and possibly one or more additional queues for other operation types.

Method 400 includes the power-allocation function of HLDP module 320 being initialized, e.g., by specifying the maximum power credit (at block 402). Typically, the maximum power credit depends on external power supply 182. The maximum power credit determines, inter alia, the number K, i.e., how many individual dies 170n may be powered up in the same time interval.

Method 400 further includes FTL 310 operating to update queue(s) 312 (at block 404). During the first instance, a queue 312 may be populated by FTL 310 as previously indicated. During a subsequent instance, the queue update thereof may also reflect the dequeued operations, e.g., as mentioned above in reference to updates 314.

Method 400 further includes FTL 310 checking queue 312 to see if there are any pending operations therein (at decision block 406). When queue 312 has no pending operations ("YES" at decision block 406), method 400 includes FTL 310 looping back to updating queue 312 (at block 404) or, in some scenarios, method 400 may be terminated.

When queue 312 has pending operations ("NO" at decision block 406), method 400 includes FTL 310 identifying prioritized operations in queue(s) 312 and generating the corresponding list 316 (at block 408). Method 400 further includes FTL 310 communicating the generated list 316 to HLDP module 320.

Method 400 also includes HLDP module 320 generating control signal 118 to cause the dies implicated by list 316 to receive power allocation in the next time interval and to further cause the remainder of the power budget (if any) to be allocated in accordance with the default scheduling scheme (at block 410). Method 400 further includes: (i) PMC 120 generating appropriate control signal 128, in response to control signal 118, to cause power-distribution switch 160 to power up the corresponding subset of storage dies 1701-170N, and (ii) the powered-up subset of storage dies 1701-170N executing the corresponding operations. The processing of method 400 is then looped back to updating queue 312 (at block 404). In another possible embodiment, method 400 alternatively or additionally include HLDP module 320 scheduling die operations based on applicable power-allocation policies (at block 410) as previously indicated.

Several non-limiting examples of method 400 being applied to some illustrative scenarios are presented and described in more detail below in reference to FIGS. 5-8. More specifically, the examples provided below deal with internal asynchronous operations of data storage device 102 and embodiments in which NVM 130 comprises computational storage.

Data storage device 102 may typically generate a relatively large number of asynchronous internal NAND operation requests. In some situations, it may be advantageous to prioritize some of those operations by including them into list 316. Several non-limiting examples of such operations are as follows:

(1) read operations that engage the read retry mechanism to recover data, such as BES operations, Soft-Bit Operations, XOR data-recovery, or other suitable read operations;
(2) the above mentioned read-scrub-based relocation;
(3) after writing certain amount of data, FTL 310 may create sync points by writing control data to dies 170n, e.g., in the form of master-status-table (MST) and/or group-address-table (GAT) pages. Additionally, FTL 130 may need to perform internal read operations. In other words, some of dies 170n may have additional control operations to be performed. Those control operation may be of a relatively urgent nature and, as such, it may be advantageous not to hold them up due to power unavailability; and
(4) page failure, although less frequent than block failure, may typically be addressed by moving the valid data from the corresponding page to a different location on the same die. In this case, the implicated die may need to be prioritized to enable the relocation to be completed expeditiously so that this die can resume normal operations.

Figure 5:
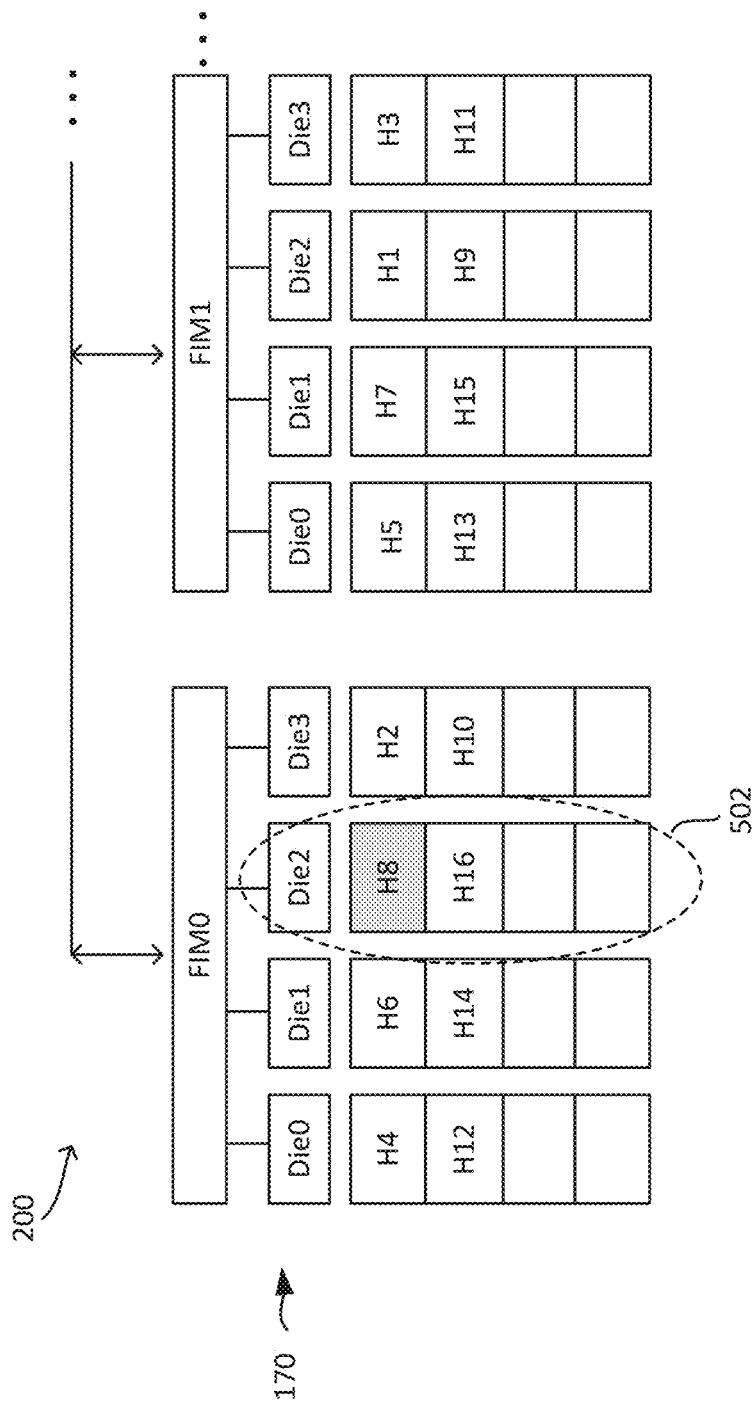
FIG. 5 is a diagram schematically illustrating an example application of the method of FIG. 4 according to an embodiment.

FIG. 5 is a diagram schematically illustrating an example application of method 400 according to an embodiment. More specifically, FIG. 5 is a schematic diagram illustrating a part of structure 200 (FIG. 2), including flash interface modules FIM0, FIM1 and the corresponding dies 170n. The blocks labeled H1-H16 represent the queued host operations in the consecutive order. For example, when the die page size is 32 kB and host 190 sends a 512-kB read command, H1 may represent the first fragment of the read command, H2 may represent the second fragment of the read command, and so on. FTL 310 has mapped the fragments to the physical addresses on the dies as indicated in FIG. 5. While executing the read command, controller 110 has determined that fragment H8 requires a read retry.

According to an example embodiment of method 400, the read retry of fragment H8 is included in list 316 (at block 408). Accordingly, HLDP 320 may generate control signal 118 (at block 410) such that the FIM0-Die2 remains powered up until the read retry of fragment H8 is successfully accomplished. The tied-up power supply powering the FIM0-Die2 may delay the execution, e.g., of read fragment H9, which was queued in queue 312 ahead of the read-retry of fragment H8.

A dashed line 502 in FIG. 5 indicates another possible scenario in the part of structure 200 illustrated in FIG. 5. In this scenario, fragments H8 and H16 encircled by the dashed line 502 encountered an unacceptably high BER, which triggered a read-scrub-based relocation. According to an example embodiment of method 400, the relocation of fragments H8, H16 is included in list 316 (at block 408). Accordingly, HLDP 320 may generate control signal 118 (at block 410) such that FIM0-Die2 remains powered up until the relocation of fragments H8, H16 is completed.

FIG. 6A is a diagram illustrating a first time interval of the relocation, wherein FTL 310 orchestrates relocation of the fragment H8 from the FIM0-Die2 to the FIM0-Die0. For the duration of this time interval, control signal 118 generated by HLDP 320 causes power supply 126 to be routed to the FIM0-Die2 and FIM0-Die0, as indicated in FIG. 6A. The remaining power budget (if any) can be routed to other dies under the default scheduling scheme, as already mentioned above.

FIG. 6B is a diagram illustrating a second time interval of the relocation, wherein FTL 310 orchestrates relocation of the fragment H16 from the FIM0-Die2 to the FIM1-Die0. For the duration of this time interval, control signal 118 generated by HLDP 320 causes power supply 126 to be routed to the FIM0-Die2 and FIM01Die0, as indicated in FIG. 6B. Again, the remaining power budget (if any) can be routed to other dies, using the default scheduling scheme.

Figure 7:
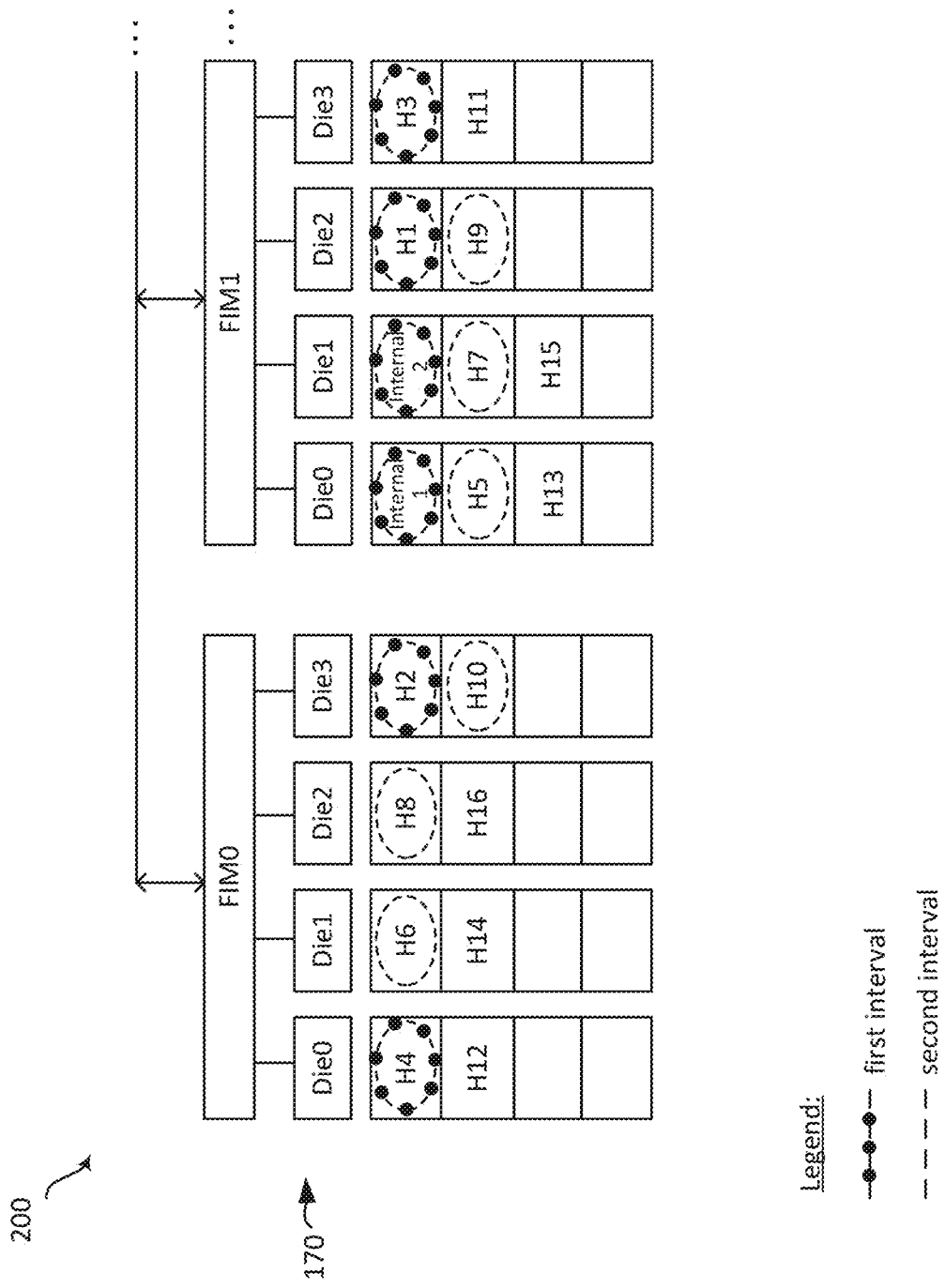
FIG. 7 are diagrams schematically illustrating yet another example application of the method of FIG. 4 according to an embodiment.

FIG. 7 is a diagram schematically illustrating yet another example application of method 400 according to an embodiment. More specifically, FIG. 7 is a schematic diagram illustrating a part of structure 200 (FIG. 2), including flash interface modules FIM0, FIM1 and the corresponding dies 170n. The power budget of power supply 126 is sufficient for up to, but not exceeding six dies 170n, i.e., K=6.

Queue 312 has queued therein a 512-kB host write command and two control operations that are internal to structure 200. The blocks labeled H1-H16 represent the sequential write fragments of the host write command. The meta-block write offset puts fragment H1 at the FIM1-Die2. The internal control operations can be, e.g., control page reads or writes, which are pending on the FIM1-Die0 and FIM1-Die1, as indicated in FIG. 7.

According to an example embodiment of method 400, these internal control operations are included in list 316 (at block 408). The control operations may be prioritized by FTL 310, e.g., because they might be freeing up several GAT-page entries or storing master pages. When such control operations are delayed, FTL 310 might have to block some other host writes until the control operations are completed, which may not be optimal.

The legend shown in FIG. 7 represents two time intervals scheduled in accordance with method 400. During the first time interval, the six dies 170n receiving the power budget are the FIM1-Die0, FIM1-Die1, FIM1-Die2, and FIM1-Die3. Method 400 causes these six dies to be selected for the first time interval as follows. The FIM1-Die0 and FIM1-Die1 are included in the selection for first time interval because the internal control operations pending thereat are included in list 316. The remaining power budget (i.e., power for four dies 170n) is allocated in accordance with the default scheduling policy, which causes the write segments to be scheduled in their sequential order. As a result, the FIM1-Die2, FIM0-Die3, FIM1-Die3, and FIM0-Die0, which correspond to the write fragments H1-H4, respectively, are scheduled to receive power in the first time interval as well.

During the second time interval, the six dies 170n receiving the power budget are the FIM0-Die3, FIM1-Die0, FIM1-Die1, and FIM1-Die2. For this time interval, list 316 is empty due to the completion of the internal control operations during the first time interval. Hence, the whole power budget (i.e., power for six dies 170n) is allocated in accordance with the default scheduling policy, which causes the remaining write segments to be scheduled in their sequential order. As a result, the FIM1-Die0, FIM0-Die1, Die2, FIM1-Die2, and FIM0-Die3, which correspond to the write fragments H5-H10, respectively, are scheduled to receive power in the second time interval.

The term "computational storage" refers to a storage architecture, where the storage device, e.g., NVM 130, is capable of performing certain computations and sending the computation results back to the host. Computational storage may typically reduce data traffic on the host I/O bus. In operation, computational storage supports conventional host read/write operations, which make use of the host I/O bus and storage dies, e.g., storage dies 170n. When computational operations are performed, the storage dies may be engaged for a longer time than otherwise. In such situations, a typical consequence may be a lower I/O bus utilization and longer time per write or read operation.

According to an example embodiment, FTL 310 may be configured to generate list 316 in a manner that helps to maintain a nearly optimal balance between I/O bus utilization and die utilization in computational storage. Mathematically, such an optimal balance can be represented by a suitable cost function, which FTL 310 can apply to the queue 312 to determine list 316 (at block 408 of method 400).

Figure 8A:
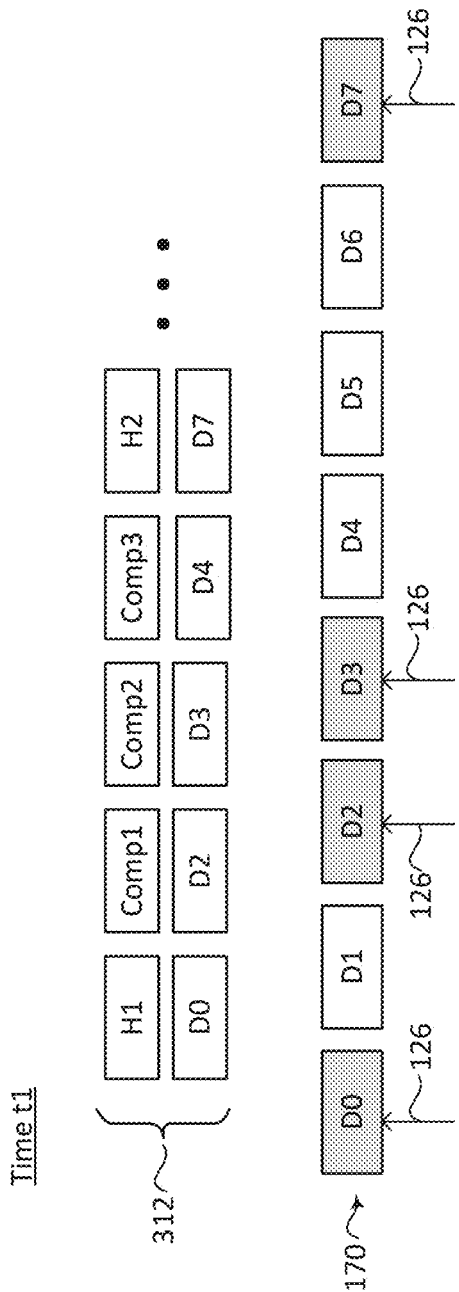
FIGS. 8A-8B are diagrams schematically illustrating an example application of the method of FIG. 4 according to another embodiment.
Figure 8B:
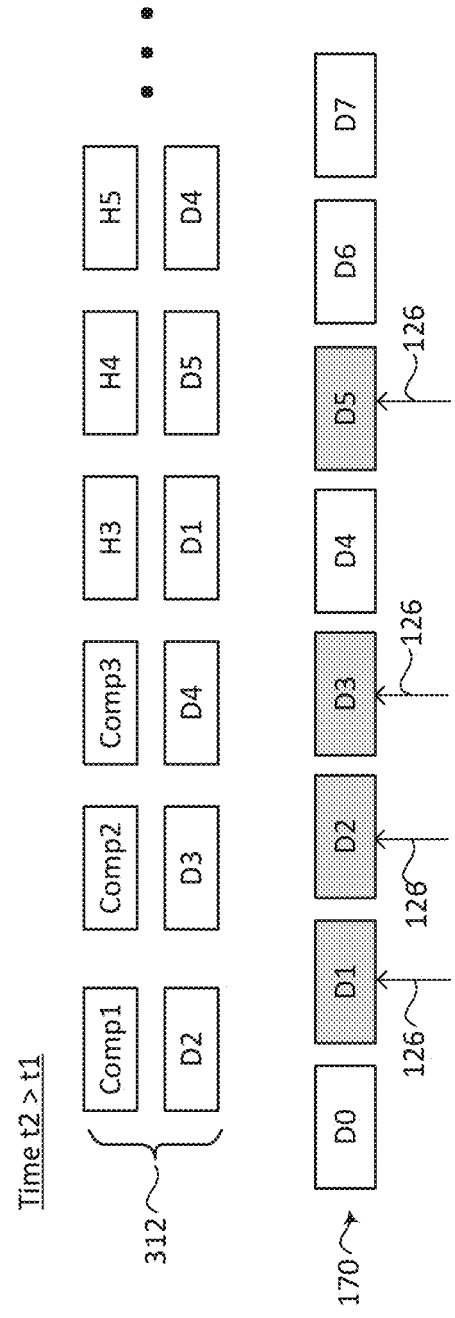

FIGS. 8A-8B are diagrams schematically illustrating an example application of method 400 to computational storage of data storage device 102 according to another embodiment. In this example, the power budget of power supply 126 is sufficient for up to, but not exceeding four dies 170n, i.e., K=4. The host I/O bus can be saturated by two dies 170n.

Referring to FIG. 8A, at time t1, the leading portion of queue 312 has therein: (i) host operations H1 and H2 on dies D0 and D7, respectively; and (ii) computational operations Comp1, Comp2, and Comp3 on dies D2, D3, and D4, respectively. The above-mentioned cost function used by FTL 310 identifies operations H1, H2, Comp1, and Comp2 for list 316 (at block 408 of method 400).

Note that the selection of host operations H1, H2 for this time slot saturates the bandwidth of the host I/O bus, which may be nearly optimal in this case. The selection of computational operations Comp1, Comp2 for this time slot enables the computations to advance in a nearly optimal manner as well. Further note that computational operation Comp3 is not included in list 316 even though Comp3 is ahead of H2 in the queue 312. In response to the list 316 compiled in this manner, HLDP 320 may generate control signal 118 such that power supply 126 is routed to the dies D0, D2, D3, and D7, as indicated in FIG. 8A, to cause the operations of list 316 to proceed in the time interval t1 (at block 410 of method 400).

Referring to FIG. 8B, at time t2, the leading portion of queue 312 has therein: (i) computational operations Comp1, Comp2, and Comp3 on dies D2, D3, and D4, respectively; and (ii) host operations H3, H4, and H5 on dies D1, D5, and D4, respectively. Note that the host operations H1 and H2 have been completed in the time interval t1 (FIG. 8A) and, as such, have been dequeued.

After the corresponding update 314, the cost function used by FTL 310 identifies operations H3, H4, Comp1, and Comp2 for list 316 (at block 408 of method 400). The selection of host operations H3, H4 for this time slot again saturates the bandwidth of the host I/O bus. The selection of computational operations Comp1, Comp2 for this time slot enables these computations to be completed in a timely manner. In response to the list 316 compiled in this manner, HLDP 320 may generate control signal 118 such that power supply 126 is routed to the dies D1, D2, D3, and D5, as indicated in FIG. 8B, to cause the operations of list 316 to proceed in the time interval t2 (at block 410 of method 400).

In some time intervals, queue 312 may have only computational operations pending therein. In such time intervals, power supply 126 can be routed exclusively to all or some of the dies 170n with pending computational operations. In a later time interval, one or more host operations may be enqueued into queue 312. As computational operations may typically take more time to complete than host operations, some of the already started computational operations may be temporarily halted, by having the power supply 126 temporarily withheld from the corresponding dies, to give way to powering up the dies involved in the host operations. The halted computational operations may be resumed later, e.g., after the host operations are finished. Such dynamic re-allocation of power supply 126 may typically be automatic, provided that the above-mentioned cost function is appropriately constructed and recomputed sufficiently often.

In some embodiments, the number of dies 170n needed to saturate the I/O bus may be dynamic as well. For example, a die throughput may vary depending on the type of operation that is being executed, whereas the host I/O may typically have a fixed throughput. However, because FTL 310 "knows" the types of the pending operations, the cost function involved in the balancing the I/O and die through-puts under method 400 may be constructed such that the types of the pending operations are factored in the process of generating control signal 118 (at blocks 408, 410).

In some embodiments, the cost function used in method 400 may be constructed to implement any desired degree of relative bias towards preferentially powering the dies involved in computational operations or the dies involved in host operations.

According to an example embodiment disclosed above, e.g., in the summary section and/or in reference to any one or any combination of some or all of FIGS. 1-8, provided is an apparatus, comprising: a first plurality of storage dies (e.g., 170n, FIG. 1) to store data; a power-management circuit (e.g., 120, FIG. 1) to connect a power supply (e.g., 182, 126, FIG. 3) to a second plurality of the storage dies, the second plurality being a subset of the first plurality and being dynamically changeable in time; and a controller (e.g., 110, FIG. 3) including firmware for a flash translation layer (e.g., 310, FIG. 3); wherein the flash translation layer is configured to maintain a queue of pending operations (e.g., 312, FIG. 3) for the first plurality of dies and is further configured to award, in a time interval, a higher priority to a first subset (e.g., 316, FIG. 3) of the pending operations than to a different second subset of the pending operations, at least one operation of the first subset being in the queue behind at least one operation of the second subset; and wherein, in response to the first subset being selected by the flash translation layer, the power-management circuit is configured (e.g., using 118, FIG. 3), in the time interval, to include storage dies corresponding to the first subset into the second plurality of the storage dies. Herein, the term "subset" refers to a group that is smaller than the corresponding full set or plurality, e.g., smaller than the full queue or smaller than the first plurality.

In some embodiments of the above apparatus, the flash translation layer is configured to award the higher priority to approximately maximize, in a sequence of time intervals, a data throughput for the first plurality of dies.

In some embodiments of any of the above apparatus, circuitry corresponding to the first plurality of storage dies is configured to perform in-storage computations; and wherein the flash translation layer is configured to award the higher priority to approximately realize, in a sequence of time intervals, a selected ratio of a data throughput on an input/output bus (e.g., I/O, FIG. 3) of the data storage device and a data throughput for the first plurality of dies.

In some embodiments of any of the above apparatus, the at least one operation of the first subset includes a read-retry operation (e.g., for H8, FIG. 5); and wherein the at least one operation of the second subset includes a host read operation (e.g., H9, FIG. 5).

In some embodiments of any of the above apparatus, the at least one operation of the first subset includes a read-scrub-based relocation (e.g., for H8, H16, FIGS. 5, 6A-6B); and wherein the at least one operation of the second subset includes a host read operation (e.g., H9, FIG. 5).

In some embodiments of any of the above apparatus, the at least one operation of the first subset includes an internal control operation (e.g., Internal 1, FIG. 7); and wherein the at least one operation of the second subset includes a host write operation (e.g., H6, FIG. 7).

In some embodiments of any of the above apparatus, the first plurality of dies is connected to the controller using a plurality of flash-interface modules (e.g., FIM0, FIM1, FIG. 2); and wherein the first subset of the pending operations includes operations on storage dies corresponding to different ones of the flash-interface modules (e.g., as indicated in FIG. 6B).

In some embodiments of any of the above apparatus, the flash translation layer is configured to keep the at least one operation of the second subset in the queue in the time interval.

In some embodiments of any of the above apparatus, in any time interval, a number of storage dies in the second plurality of the storage dies does not exceed a fixed number.

According to another example embodiment disclosed above, e.g., in the summary section and/or in reference to any one or any combination of some or all of FIGS. 1-8, provided is a method performed by a data storage device (e.g., 102, FIG. 1), the method comprising: maintaining (e.g., 404, FIG. 4) a queue of pending operations (e.g., 312, FIG. 3) for a first plurality of storage dies (e.g., 170n, FIG. 1) of the data storage device; awarding (e.g., 408, FIG. 4), in a time interval, a higher priority to a first subset (e.g., 316, FIG. 3) of the pending operations than to a different second subset of the pending operations, at least one operation of the first subset being in the queue behind at least one operation of the second subset; and connecting (e.g., 410, FIG. 4) a power supply (e.g., 182, 126, FIG. 3) to a second plurality of the storage dies, the second plurality being a subset of the first plurality and being dynamically changeable in time; and wherein, in the time interval, the connecting comprises including storage dies corresponding to the first subset into the second plurality of the storage dies in response to the awarding.

In some embodiments of the above method, the awarding comprises awarding the higher priority to approximately maximize, in a sequence of time intervals, a data throughput for the first plurality of dies.

In some embodiments of any of the above methods, circuitry corresponding to the first plurality of storage dies is configured to perform in-storage computations; and wherein the awarding comprises awarding the higher priority to approximately realize, in a sequence of time intervals, a selected ratio of a data throughput on an input/output bus (e.g., I/O, FIG. 3) of the data storage device and a data throughput for the first plurality of dies.

In some embodiments of any of the above methods, the at least one operation of the first subset includes a read-retry operation (e.g., for H8, FIG. 5); and wherein the at least one operation of the second subset includes a host read operation (e.g., H9, FIG. 5).

In some embodiments of any of the above methods, the at least one operation of the first subset includes a read-scrub-based relocation (e.g., for H8, H16, FIGS. 5, 6A-6B); and wherein the at least one operation of the second subset includes a host read operation (e.g., H9, FIG. 5).

In some embodiments of any of the above methods, the at least one operation of the first subset includes a control operation (e.g., Internal 1, FIG. 7) internal to the data storage device; and wherein the at least one operation of the second subset includes a host write operation (e.g., H6, FIG. 7).

In some embodiments of any of the above methods, the first plurality of dies is connected to a controller of the data storage device using a plurality of flash-interface modules (e.g., FIM0, FIM1, FIG. 2); and wherein the first subset of the pending operations includes operations on storage dies corresponding to different ones of the flash-interface modules (e.g., as indicated in FIG. 6B).

In some embodiments of any of the above methods, the method further comprises keeping the at least one operation of the second subset in the queue in the time interval.

In some embodiments of any of the above methods, in any time interval, a number of storage dies in the second plurality of the storage dies does not exceed a fixed number.

In some embodiments of any of the above methods, the method further comprises receiving the power supply from a host device (e.g., 190, FIG. 1) connected to the data storage device.

According to yet another example embodiment disclosed above, e.g., in the summary section and/or in reference to any one or any combination of some or all of FIGS. 1-8, provided is an apparatus, comprising: means (e.g., 110, FIG. 3) for maintaining a queue of pending operations (e.g., 312, FIG. 3) for a first plurality of dies (e.g., 170*n*, FIG. 1) of the data storage device; means (e.g., 310, FIG. 3) for awarding, in a time interval, a higher priority to a first subset (e.g., 316, FIG. 3) of the pending operations than to a different second subset of the pending operations, at least one operation of the first subset being in the queue behind at least one operation of the second subset; and means (e.g., 120, FIG. 3) for connecting a power supply (e.g., 182, 126, FIG. 3) to a second plurality of the storage dies, the second plurality being a subset of the first plurality and being dynamically changeable in time; and wherein, in the time interval, the means for connecting is configured to include storage dies corresponding to the first subset into the second plurality of the storage dies in response to the awarding.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Unless explicitly stated otherwise, each numerical value and range should be interpreted as being approximate as if the word "about" or "approximately" preceded the value or range.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

"SUMMARY" in this specification is intended to introduce some example embodiments, with additional embodiments being described in "DETAILED DESCRIPTION" and/or in reference to one or more drawings. "SUMMARY" is not intended to identify essential elements or features of the claimed subject matter, nor is it intended to limit the scope of the claimed subject matter.

"ABSTRACT" is provided to allow the reader to quickly ascertain the nature of the technical disclosure. It is submitted with the understanding that it will not be used to interpret or limit the scope or meaning of the claims. In addition, in the foregoing "DETAILED DESCRIPTION," it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into "DETAILED DESCRIPTION," with each claim standing on its own as a separately claimed subject matter.

What is claimed is:

1. A data storage device, comprising:
   a first plurality of storage dies to store data;
   a power-management circuit to connect a power supply to a second plurality of the storage dies, the second plurality being a subset of the first plurality and being dynamically changeable in time; and
   a controller including firmware for a flash translation layer;
   wherein the flash translation layer is configured to maintain a queue of pending operations for the first plurality of dies and is further configured to award, in a time interval, a higher priority to a first subset of the pending operations than to a different second subset of the pending operations, at least one operation of the first subset being in the queue behind at least one operation of the second subset; and
   wherein, in response to the first subset being selected by the flash translation layer, the power-management circuit is configured, in the time interval, to include storage dies corresponding to the first subset into the second plurality of the storage dies.

2. The data storage device of claim 1, wherein the flash translation layer is configured to award the higher priority to maximize, in a sequence of time intervals, a data throughput for the first plurality of dies.

3. The data storage device of claim 1,
   wherein circuitry corresponding to the first plurality of storage dies is configured to perform in-storage computations; and
   wherein the flash translation layer is configured to award the higher priority to realize, in a sequence of time intervals, a selected ratio of a data throughput on an input/output bus of the data storage device and a data throughput for the first plurality of dies.

4. The data storage device of claim 1,
   wherein the at least one operation of the first subset includes a read-retry operation; and
   wherein the at least one operation of the second subset includes a host read operation.

5. The data storage device of claim 1,
   wherein the at least one operation of the first subset includes a read-scrub-based relocation; and
   wherein the at least one operation of the second subset includes a host read operation.

6. The data storage device of claim 1,
   wherein the at least one operation of the first subset includes an internal control operation; and
   wherein the at least one operation of the second subset includes a host write operation.

7. The data storage device of claim 1,
   wherein the first plurality of dies is connected to the controller using a plurality of flash-interface modules; and
   wherein the first subset of the pending operations includes operations on storage dies corresponding to different ones of the flash-interface modules.

8. The data storage device of claim 1, wherein the flash translation layer is configured to keep the at least one operation of the second subset in the queue in the time interval.

9. The data storage device of claim 1, wherein, in any time interval, a number of storage dies in the second plurality of the storage dies does not exceed a fixed number.

10. A method performed by a data storage device, the method comprising:
    maintaining a queue of pending operations for a first plurality of storage dies of the data storage device;
    awarding, in a time interval, a higher priority to a first subset of the pending operations than to a different second subset of the pending operations, at least one operation of the first subset being in the queue behind at least one operation of the second subset; and connecting a power supply to a second plurality of the storage dies, the second plurality being a subset of the first plurality and being dynamically changeable in time; and wherein, in the time interval, the connecting comprises including storage dies corresponding to the first subset into the second plurality of the storage dies in response to the awarding.

11. The method of claim 10, wherein the awarding comprises awarding the higher priority to maximize, in a sequence of time intervals, a data throughput for the first plurality of dies.

12. The method of claim 10, wherein circuitry corresponding to the first plurality of storage dies is configured to perform in-storage computations; and wherein the awarding comprises awarding the higher priority to realize, in a sequence of time intervals, a selected ratio of a data throughput on an input/output bus of the data storage device and a data throughput for the first plurality of dies.

13. The method of claim 10, wherein the at least one operation of the first subset includes a read-retry operation; and wherein the at least one operation of the second subset includes a host read operation.

14. The method of claim 10, wherein the at least one operation of the first subset includes a read-scrub-based relocation; and wherein the at least one operation of the second subset includes a host read operation.

15. The method of claim 10, wherein the at least one operation of the first subset includes a control operation internal to the data storage device; and wherein the at least one operation of the second subset includes a host write operation.

16. The method of claim 10, wherein the first plurality of dies is connected to a controller of the data storage device using a plurality of flash-interface modules; and wherein the first subset of the pending operations includes operations on storage dies corresponding to different ones of the flash-interface modules.

17. The method of claim 10, further comprising keeping the at least one operation of the second subset in the queue in the time interval.

18. The method of claim 10, wherein, in any time interval, a number of storage dies in the second plurality of the storage dies does not exceed a fixed number.

19. The method of claim 10, further comprising receiving the power supply from a host device connected to the data storage device.

20. An apparatus, comprising:

means for maintaining a queue of pending operations for a first plurality of dies of the data storage device;

means for awarding, in a time interval, a higher priority to a first subset of the pending operations than to a different second subset of the pending operations, at least one operation of the first subset being in the queue behind at least one operation of the second subset; and means for connecting a power supply to a second plurality of the storage dies, the second plurality being a subset of the first plurality and being dynamically changeable in time; and wherein, in the time interval, the means for connecting is configured to include storage dies corresponding to the first subset into the second plurality of the storage dies in response to the awarding.

* * * * *